United States Patent [19]

Diepers et al.

[11] 3,775,840

[45] Dec. 4, 1973

[54] METHOD OF PRODUCING A COMPOSITE CONDUCTOR BAND FOR USE IN MAKING A TUBULAR SUPERCONDUCTOR

[75] Inventors: Heinrich Diepers, Erlangen-Bruck; Horst Musebeck, Erlangen, both of Germany

[73] Assignee: Siemens Aktiengesellschaft, Munich, Germany

[22] Filed: Aug. 10, 1972

[21] Appl. No.: 279,387

[30] Foreign Application Priority Data

Aug. 19, 1971 Germany .................. P 21 41 621.7

[52] U.S. Cl. .......... 29/599, 174/126 CP, 174/DIG. 6

[51] Int. Cl. ........................................... H01v 11/00

[58] Field of Search ................. 29/599; 174/126 CP, 174/DIG. 6; 335/216

[56] References Cited

UNITED STATES PATENTS

| | | | |
|---|---|---|---|
| 3,507,038 | 4/1970 | Moll et al. | 29/599 |
| 3,548,078 | 12/1970 | Albrecht et al. | 29/599 X |
| 3,591,705 | 7/1971 | Grigsby et al. | 335/216 X |
| 3,657,466 | 4/1972 | Woolcock et al. | 174/DIG. 6 |
| 3,699,647 | 10/1972 | Bidault et al. | 29/599 |

FOREIGN PATENTS OR APPLICATIONS

| | | | |
|---|---|---|---|
| 1,952,148 | 8/1970 | Germany | 29/599 |

*Primary Examiner*—Charles W. Lanham
*Assistant Examiner*—D. C. Reiley, III
*Attorney*—Hugh A. Chapin

[57] ABSTRACT

A method for producing a conductor band which includes a layer of niobium adjacent a layer of an electrically normal conducting metal and respective niobum chords defining the longitudinal edges of the band. The bimetal conductor band is produced by bending a niobium strip to have a U-shaped profile, at least approximately filling the space bounded by the inside surface of the U-shaped niobium strip with an electrically normal conducting metal, and then joining the normal conducting metal to the U-shaped niobium strip to form the band. The bimetal conductor band made in this manner is used in a method of producing a tubular conductor for supetconducting cables and the like.

9 Claims, 3 Drawing Figures

METHOD OF PRODUCING A COMPOSITE CONDUCTOR BAND FOR USE IN MAKING A TUBULAR SUPERCONDUCTOR

BACKGROUND OF THE INVENTION

The invention relates to a method of producing a conductor band used in a method of producing tubular conductors for superconducting cables and the like.

More particularly, the invention relates to a method of producing a conductor band from which tubular conductors can be made in accordance with the method disclosed in patent application Ser. No. 279,388, filed Aug. 10, 1972, by Hans Pfister and Heinrich Deipers.

The subject of the patent application referred to above is a method of producing tubular conductors which include a niobium layer and a layer of electrically normal-conducting metal, preferably copper. The tubular conductors are especially suitable for superconducting cables. In this method a band is first produced which comprises the two layers and is provided with niobium chords at its edges. The band is then bent to form a tube in such a manner that the niobium chords disposed at the two edges of the strip mutually abut at their free lateral surfaces. Subsequently, the mutually adjacent surfaces of the niobium chords are joined together, preferably by means of electron-beam welding. A particular feature of the method are steps for manufacturing the bimetal band wherein respective niobium chords are welded to the two edges of a niobium foil strip by means of electron-beam welding in such a manner that a niobium band of U-shaped cross-section is produced. The free space of the U-shaped cross-section is filled at least partially with the normal-conducting metal. Subsequently, the metal is joined to the niobium strip and to the lateral chords under the action of heat.

The method of producing the conductor band used in making the tubular conductors as described above and in the patent application referred to can be further simplified. For example, it is not necessary that the U-shaped niobium band be made by welding the chords to the niobium foil strip.

SUMMARY OF THE INVENTION

It is an object of the invention to provide a method of producing a conductor band used for making a tubular conductor for superconducting cables and the like. Subsidiary to this object, it is an object of the invention to provide a method for producing such a conductor band which is simpler to perform than the method discussed above.

According to a feature of the invention, the conductor band is produced by bending a niobium strip to form a strip of U-shaped cross-section and then filling the space enclosed by the U-shaped profile at least approximately with the normal-conducting metal. Then the step of joining the niobium strip and normal-conducting metal together is performed. The niobium chords at the lateral edges of the bimetal band produced in this manner are thus made solely by deformation of the niobium band. The U-shaped cross-section produced in this manner then serves as a melting mold for the normal-conducting metal which is preferably copper.

Because the nature of the surfaces of the two materials affects the process of joining the mutually adjacent surfaces together, it is advantageous to subject the already prepared U-shaped niobium strip and strip of normal-conducting metal to a surface cleaning process before joining them together by heat treatment.

Because the mechanical stability of a niobium foil with a thickness such as is required for the finished conductor is small, a niobium foil with a particularly thick cross-section can first be bent to form a strip having a U-shaped cross-section into which correspondingly, a somewhat thicker metal strip is placed, this being in accordance with a further especially advantageous feature of the method of the invention. After bonding these two materials together to form a bimetal conductor band, this band can be metal formed to have a smaller thickness as is required for the tubular conductor. This deformation is accomplished in a simple manner by cold-rolling the prefabricated bimetallic band.

Although the invention is illustrated and described herein as a method of producing a conductor band for use in making a tubular conductor for superconducting cables and the like, it is nevertheless not intended to be limited to the details shown, since various modifications may be made therein within the scope and the range of the claims. The invention, however, together with additional objects and advantages will be best understood from the following description and in connection with the accompanying drawings.

Figure 1:
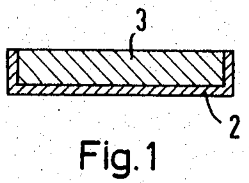
FIG. 1 illustrates a transverse cross-section of a bimetal conductor band produced according to the method of the invention.
Figure 2:
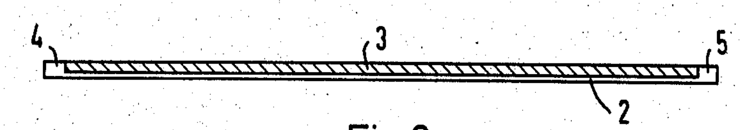
FIG. 2 shows the bimetal conductor band of FIG. 1 after the same has been metal formed according to a subsidiary feature of the method of the invention.

It may be advisable in some cases to place a copper strip 3 into the U-shaped profile 1 which is slightly arched upward, so that in the subsequent heat treatment, good evacuation between the mutually adjacent surfaces is assured. The best treatment is preferably performed in a vacuum of, for example, $10^{-4}$ to $10^{-5}$ Torr and at a temperature of about 1,100°C.

Subsequently, the bimetal strip is brought down to the narrower cross-section preferably by cold deformation such as by cold-rolling, this section being required for the tubular conductor to be formed later. The finished copper strip 3 is thus provided on one flat side with the niobium layer which forms at the two longitudinal edges of the copper strip 3, respective chords 4 and 5. The total thickness of this finished bimetal band can be approximately 1 mm for example.

It may be advisable in some cases to roll the finished bimetal band several times. The band can advantageously be subjected to a heat treatment between the individual rolling operations. Mechanical stresses in the material caused by the cold deformation can be thereby removed. The bimetal strip can, for example, be annealed at a temperature of several hundred degrees, preferably at least 700°C and for an extended period of time, preferably at least 2 hours.

Figure 3:
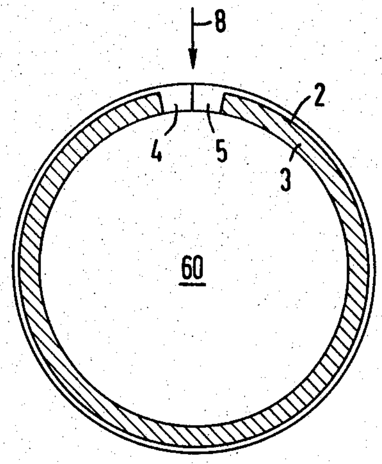
FIG. 3 illustrates a sectional view of a tubular conductor made with a bimetal conductor band produced according to the method of the invention. cl DESCRIPTION OF THE PREFERRED EMBODIMENTS OF THE INVENTION Referring to FIG. 1, the lateral edges of a niobium strip 2 are bent upward in such a manner that a member having a U-shaped profile is formed. The U-shaped profile has a relatively wide bottom surface and comparatively shorter lateral surfaces which serve as chords for welding the seam of the tubular conductor which is made later. The U-shaped section serves as a boat or, more specifically, as a container for a metal filling 3 which preferaby consists of copper and has a substantially lower melting point than the niobium. The thickness of the niobium 2 and that of the copper 3 may, for example, be in the ratio 1:10. However, for the purpose of illustration, the niobium and copper are shown in the drawing with size ratio that deviates somewhat from the actual ratio. It is advantageous to subject the two materials to a surface treatment before bonding them together, preferably by means of electrolytic polishing or chemical etching. The materials are bonded together by a thermal process, such as by induction heating. It is advantageous to treat the surfaces of the bimetal band thus fabricated once more after the mutually adjacent surfaces of the niobium 2 and the copper 3 have been bonded together; this treatment should be such that smooth, plane parallel surfaces on the two flat sides of the composite band are obtained.

The bimetal band is then formed by bending into the shape of a tubular conductor 60 as shown in FIG. 3 in such a manner that the outer edges of the two chords 4 and 5 are mutually adjacent. The joint is preferably made by an electron beam which is indicated by an arrow 8 in FIG. 3.

What is claimed is:

1. In a method of producing a tubular conductor for superconducting cables from a bimetal conductor band having a layer of niobium adjacent a layer of an electrically normal conducting metal and having respective niobium chords which define the longitudinal edges of the band; the tubular conductor being made by bending the band to cause the niobium chords to mutually abut thereby forming a tube, and then metallurgically bonding the mutually abutting niobium chords to each other; the improvement comprising producing the bimetal conductor band by the steps of bending the two end portions of a niobium strip to form an U-shaped profile, the bent end portions thereby defining the niobium chords; at least approximately filling the space bounded by the inside surface of the U-shaped niobium strip with an electrically normal conducting metal; and then metallurgically bonding the normal conducting metal to the U-shaped niobium strip to form the bimetal conductor band.

2. The method of claim 1 wherein the U-shaped niobium strip is at least approximately filled with copper as the electrically normal conducting material.

3. The method of claim 1 wherein the U-shaped niobium strip is at least approximately filled by laying a strip of normal conducting metal in the space bounded by the inside surface thereof.

4. The method of claim 3 wherein before bonding the normal conducting metal to the U-shaped niobium strip, the method comprises cleaning the respective surfaces of the niobium strip and strip of normal conducting metal.

5. The method of claim 4 wherein the respective surfaces of the niobium strip and the strip of normal conducting metal are cleaned by electrolytically polishing the same.

6. The method of claim 4 wherein the respective surfaces of the niobium strip and the strip of normal conducting metal are cleaned by chemically etching the same.

7. The method of claim 1 wherein after metallurgically bonding the normal conducting metal to the U-shaped niobium strip, the method comprises working the bimetal conductor band to impart thereto a narrower thickness.

8. The method of claim 7 wherein the bimetal conductor band is worked by means of cold rolling.

9. The method of claim 8 comprising alternately cold-rolling and heat-treating the bimetal conductor band a predetermined number of times.

* * * * *